(12) United States Patent
Kim et al.

(10) Patent No.: US 11,534,922 B2
(45) Date of Patent: Dec. 27, 2022

(54) RIDING SYSTEM OF ROBOT AND METHOD THEREOF

(71) Applicant: LG ELECTRONICS INC., Seoul (KR)

(72) Inventors: Boyeon Kim, Seoul (KR); Bina Kim, Seoul (KR); Jinsu Kim, Seoul (KR); Mina Suh, Seoul (KR); Jungkyu Son, Seoul (KR); Hyesun Lee, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 16/839,860

(22) Filed: Apr. 3, 2020

(65) Prior Publication Data
US 2021/0046652 A1 Feb. 18, 2021

(30) Foreign Application Priority Data
Aug. 16, 2019 (KR) .................. 10-2019-0100226

(51) Int. Cl.
*B25J 5/00* (2006.01)
*B25J 9/16* (2006.01)
*B25J 11/00* (2006.01)
*B25J 9/00* (2006.01)

(52) U.S. Cl.
CPC .......... *B25J 9/1679* (2013.01); *B25J 9/0009* (2013.01); *B25J 11/0005* (2013.01); *B25J 11/009* (2013.01); *B25J 5/007* (2013.01)

(58) Field of Classification Search
CPC ........... H04L 63/08; H04L 63/0861; H04L 2463/082; B25J 11/0005; B25J 11/009; B25J 9/0009; B25J 9/1679; B25J 5/007; H04W 12/069; G06N 3/08; G01C 21/3415; G01R 31/387; G01R 31/367;
(Continued)

(56) References Cited

U.S. PATENT DOCUMENTS
2015/0241917 A1    8/2015 Seok et al.

FOREIGN PATENT DOCUMENTS
KR    10-2015-0099667 A    9/2015

OTHER PUBLICATIONS
Sawasaki et al., Application of humanoid robots to building and home management services, 2003, IEEE, p. 2992-2997 (Year: 2003).*

(Continued)

*Primary Examiner* — McDieunel Marc
(74) *Attorney, Agent, or Firm* — Birch, Stewart, Kolasch & Birch, LLP

(57) ABSTRACT

A riding system of a robot which supports a PUI through user authentication to provide convenience to users, and including a server for exchanging authentication information with the robot; a mobile terminal including an application interlocking with the server and for arranging use information of the user through the application and for calling the robot through the application; and a robot storing the authentication information, to authenticate the user through the authentication information when there is a call from the mobile terminal, and deforming according to a body size of the user included in the use information and to allow the user to ride thereon and to move the user to the destination, and a control method thereof.

20 Claims, 6 Drawing Sheets

(58) Field of Classification Search
CPC ............... B60L 58/10; B60L 2260/54; B60L 2240/642; Y02T 10/70; Y02T 90/16; Y02T 10/72
See application file for complete search history.

(56) References Cited

OTHER PUBLICATIONS

Miura et al., Interactive Teaching of a Mobile Robot, 2006, IEEE, p. 3378-3383 (Year: 2006).*
Ma et al., Scene specified control for internet-based mobile robot operation, 2009, IEEE, p. 217-222 (Year: 2009).*
Ochiai et al., Remote control system for multiple mobile robots using touch panel interface and autonomous mobility, 2014, IEEE, p. 3272-3277 (Year: 2014).*

* cited by examiner

RIDING SYSTEM OF ROBOT AND METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0100226, filed on Aug. 16, 2019, the contents of which are all hereby incorporated by reference herein in their entirety.

FIELD OF INVENTION

The present disclosure relates to a riding system of a robot and a control method thereof, and more particularly, to a riding system of a robot which supports a physical user interface (PUI) through user authentication to provide convenience to users, and a control method thereof.

BACKGROUND OF THE INVENTION

Recently, functions of a robot are expanding due to development of deep learning technology, self-driving technology, automatic control technology, the Internet of Things, and the like.

In regard to each technology in detail, the deep learning is one of fields of machine learning. The deep learning a technology of allowing a program to execute similar determinations in various situations, not checking conditions and setting the program with commands in advance. Accordingly, according to the deep learning, a computer can think similarly to a human brain and analyze massive amounts of data.

Self-driving is a technology that allows machine to determine on its own to move and avoid an obstacle. According to the self-driving technology, a robot autonomously recognizes a location through a sensor to move and avoid an obstacle.

An automatic control technology refers to a technology for automatically controlling an operation of machine by feeding back a measured value obtained by inspecting a state of the machine in the machine to a control device. Accordingly, the machine can be controlled without a human operation, and a target to be controlled can be automatically adjusted to fall within a targeted range, that is, to a target value.

The Internet of Things refers to an intelligent technology and service that connects all things based on the Internet and communicates information between a person and an object, and between objects. Devices connected to the Internet by the Internet of Things transmit and receive the information by their own determinations and communicate with each other autonomously without any assist of a human.

Applications of the robot are generally classified into industrial, medical, astronautic, and submarine field. For example, the robot may perform repetitive tasks in the machining industry such as automobile manufacturing. In other words, a lot of industrial robots have been already in operation in which the robots can repeat the same motion for hours once a human teaches a task performed by an arm to the robots.

The robot has a fixed shape, and, even when a user mounts or rides thereon, the shape of the robot remains unchanged. In this case, there is a need for a PUI for operating the robot to suit to a body of a person.

In this regard, Korean Patent Publication No. 2015-0099667 (Curved Main Body and Wearable Device Including the Same), which is also published as US 2015/0241917, discloses technology for providing a PUI optimized to utilization of various UIs, which includes: a strap provided with a rectangular opening and including a buckle disposed at one end thereof; a buckle portion for fastening both ends of the strap by tying together; and a main body coupled to the opening by being inserted or decoupled therefrom, wherein the main body includes a front surface and a rear surface, the main body includes a substantially rectangular curved display disposed on the front surface when viewed from above, and a biometric recognition sensor disposed on the rear surface, and further includes a sensor unit to detect a touch, a pressure, or a temperature, in addition to a curved soft LCD configuration.

However, there is inconvenience that a person should directly adjust equipment to suit to his/her body, and in particular, there is a problem that, when a person having mobility difficulty uses an airport robot, the person should manually adjust the robot to suit to his/her body.

SUMMARY OF THE INVENTION

One object of the present disclosure is to provide a riding system of a robot which recognizes a user and automatically performs a PUI.

Another object of the present disclosure is to provide a riding system of a robot which performs a user customized service through user recognition, and a control method thereof.

To achieve the above-described object, the present disclosure provides a control method of a riding system of a robot which moves a user to a destination by using authentication information, the method including: a first operation of, when the user inputs pre-arranged use information into a server through an application and the user calls a robot in standby through the application, moving, by the robot, to a riding position of the user according to position transmission of the server; a second operation of authenticating the user by bringing a pre-issued code included in a mobile of the user into contact with the robot; and a third operation of deforming a structure of the robot to suit to a body size of the user included in the use information, and moving to the destination.

According to an embodiment, the first operation may include inputting the body size of the user when the mobile accesses the server, and the body size may include at least one of a weight, a height, an arm length, a leg length, or a ratio of an upper body of the user to a lower body of the user.

According to an embodiment, the first operation may include inputting convenient information of the user when the mobile accesses the server, and the convenient information may include at least one of a seat size, whether a cup holder is mounted or not, a crutch holder, or a carrier holder.

According to an embodiment, the first operation may include: waiting, by the robot which stores the use information; recognizing, by the server, a position where the application runs when the mobile accesses the server; and transmitting, by the server, the position where the application runs to the robot.

According to an embodiment, the second operation may include authenticating the user by comparing authentication information generated by using personal information of the user, and authentication information of the code.

According to an embodiment, the second operation may further include providing a voice guide to instruct the user to try user authentication again, when authentication of the user fails.

According to an embodiment, the third operation may further include: calculating a standardized robot shape by analyzing the body size; and deforming at least one of a back, a footrest, a display, or a handle of the robot to suit to the body of the user.

According to an embodiment, the third operation may include: informing the user of a start by using a voice before starting to the destination; and starting to the destination based on confirmation of the user.

According to an embodiment, the method may include, after the third operation: changing, by the robot, to a standby shape; and moving to a storage of the robot.

The present disclosure also provides a riding system of a robot which moves a user to a destination by using authentication information, the system including: a server configured to exchange the authentication information with the robot; a mobile terminal including an application interlocking with the server to use the robot, and configured to arrange use information of the user through the application and to call the robot in standby through the application; and a robot configured to store the authentication information, to authenticate the user through the authentication information when there is a call from the mobile terminal, and to deform a structure according to a body size of the user included in the use information and to allow the user to ride thereon and to move the user to the destination.

According to an embodiment, when the mobile terminal calls the robot through the application, the server may identify a position where the application runs and transmit the position to the robot.

According to an embodiment, when the mobile terminal accesses the server, the mobile terminal may be requested to input a body size of the user and convenient information to use while moving to the destination, and the body size may include at least one of a weight, a height, an arm length, a leg length, or a ratio of an upper body and a lower bod of the user, and the convenient information may include at least one of a seat size, whether a cup holder is mounted or not, a crutch holder, or a carrier holder.

The robot may authenticate the user by comparing authentication information generated by using personal information of the user, and authentication information of a code pre-issued to the user, and, when authentication of the user fails, may provide a voice guide to instruct the user to try user authentication again.

The robot may calculate a standardized robot shape by analyzing the body size, and may deform at least one of a back, a footrest, a display, or a handle of the robot to suit to the body of the user according to the standardized robot shape.

According to an embodiment, the robot may inform the user of a start by using a voice before starting to the destination and may start when the user identifies the start.

The robot may change to a standby shape of the robot after completely moving to the destination, and may move to a storage for a next user.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION

Figure 1:
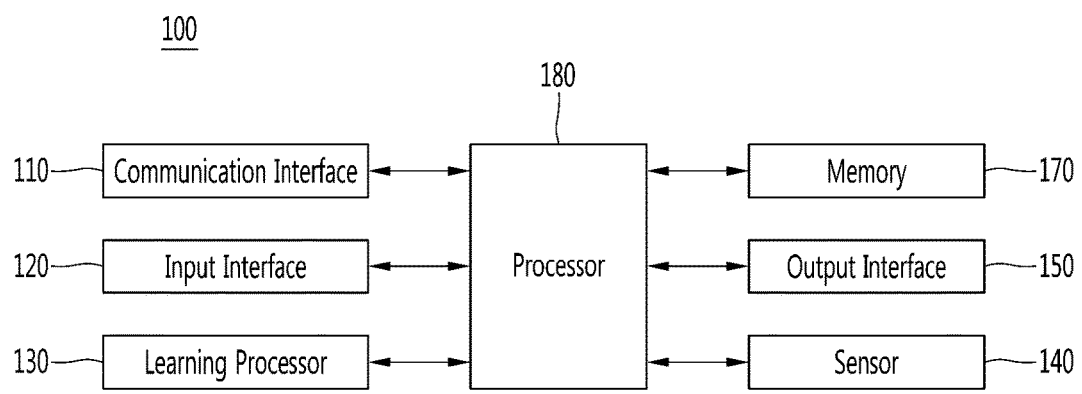
FIG. 1 is a view illustrating an AI device according to an embodiment of the present disclosure.

Hereinafter, embodiments of the present disclosure will be described with reference to the accompanying drawings. The accompanying drawings are just provided for easy understanding of embodiments of the disclosure, and the technical concept of the present disclosure is not limited by the accompanying drawings, and the drawings should be construed as including all changes, equivalents, or replacements included in the technical concept and the scope of the present disclosure.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit (e.g., unit, module, assembly), and the driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensing unit 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB (red, green, blue) sensor, an IR (infrared) sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic interface for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
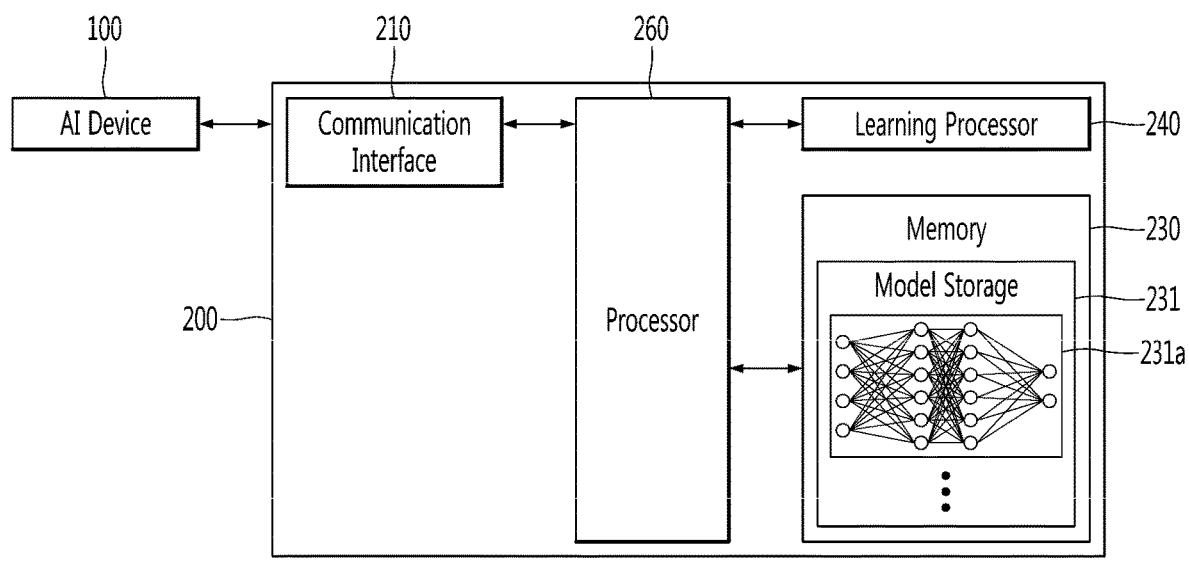
FIG. 2 is a view illustrating an AI server according to an embodiment of the present disclosure.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage unit may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
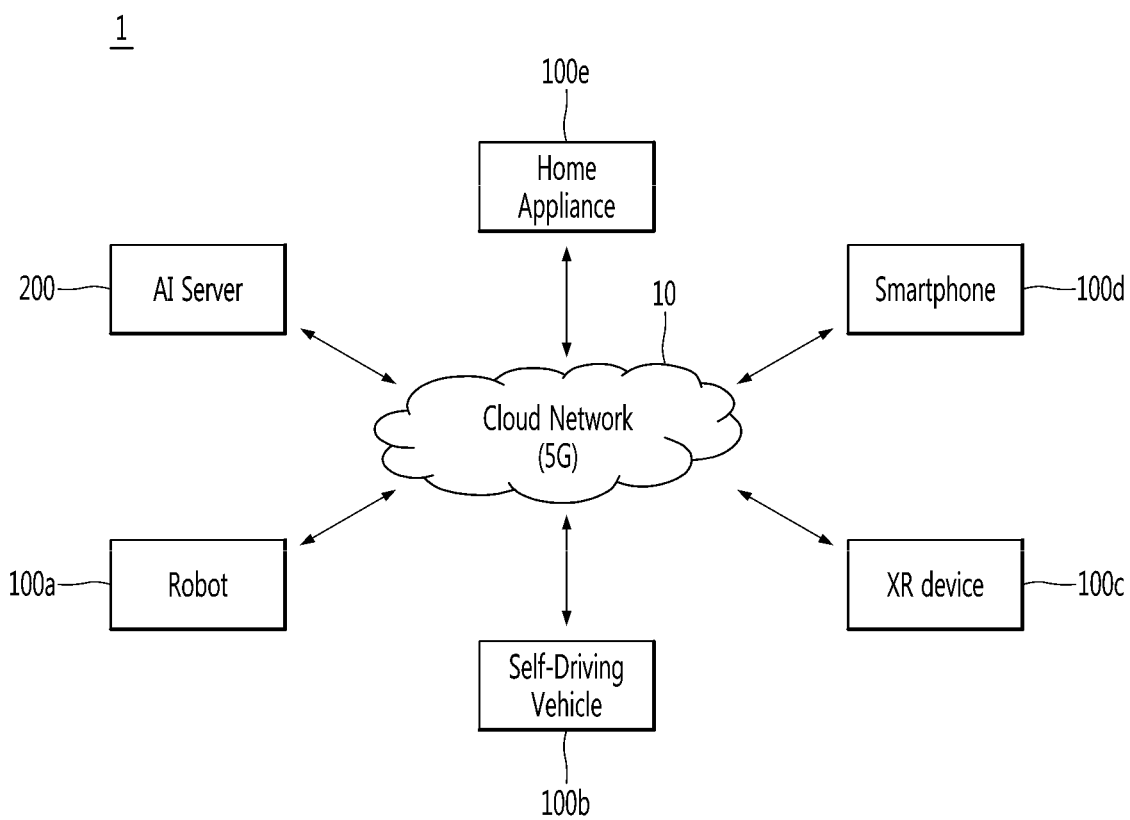
FIG. 3 is a view illustrating an AI system according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Figure 4:
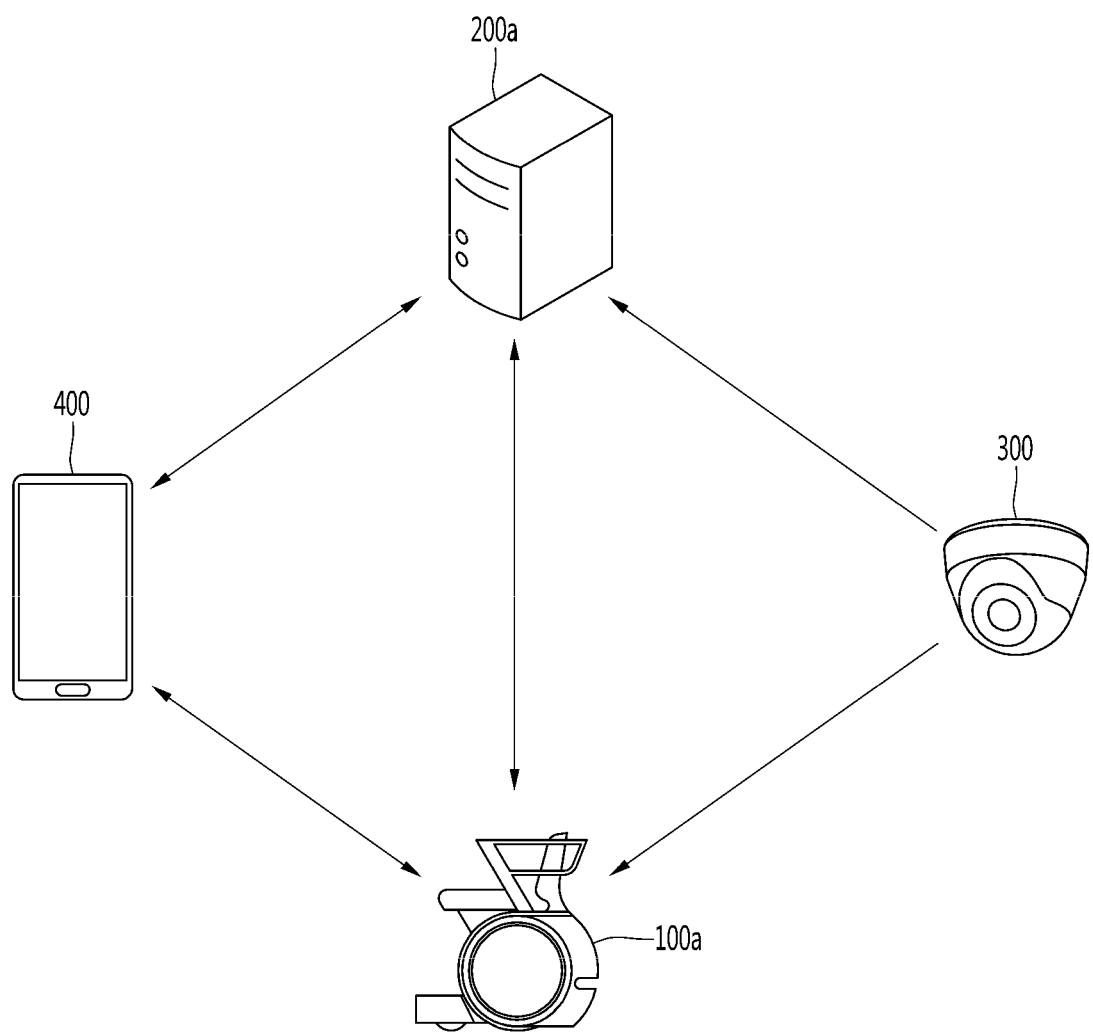
FIG. 4 is a system diagram showing a structure of a robot system according to the embodiments.

Referring to FIG. 4, the robot system may include a robot 100a, a server 200a, a camera 300, and a mobile terminal 400.

In a riding system of the robot which moves a user to a destination by using authentication information, the server 200a may exchange the authentication information with the robot, and the mobile terminal may be referred to as a mobile and may include an application interlocking with the sever 200a to use the robot, and may arrange use information of the user through the application and may call the robot in standby through the application.

The robot may store the authentication information, and, may authenticate the user through the authentication information when there is a call from the mobile, and may deform a structure according to a body size of the user included in the use information, and may have the user seated thereon and move to the destination.

The robot 100a may perform patrol, guidance, cleaning, disinfection and transportation. The robot 100a may transmit and receive signals to and from the server 200a or the mobile terminal 400. For example, the robot 100a may transmit and receive a signal including situation information in an airport to and from the server 200a. In addition, the robot 100*a* may receive image information captured for respective regions of the airport from the camera 300 in the airport.

Accordingly, the robot 100*a* may monitor the situation of the airport through the image information captured by the robot 100*a* and the image information received from the camera 300.

The robot 100*a* may directly receive a command from the user. For example, a command may be directly received from the user through input of touching the display unit provided in the robot 100*a* or voice input.

The robot 100*a* may perform patrol, guidance, cleaning, etc. according to the command received from the user, the server 200*a*, or the mobile terminal 400.

Next, the server 200*a* may receive information from the robot 100*a*, the camera 300, and/or the mobile terminal 400. The server 200*a* may collect, store and manage the information received from the devices. The server 200*a* may transmit the stored information to the robot 100*a* or the mobile terminal 400. In addition, the server 200*a* may transmit command signals to a plurality of the robots 100*a*.

The camera 300 may include all cameras which are installed, such as a plurality of closed circuit television (CCTV) cameras, an infrared thermal-sensing camera, etc. The camera 300 may transmit the captured image to the server 200*a* or the robot 100*a*.

The mobile terminal 400 may transmit and receive data to and from the server 200*a*. For example, if the server 200*a* is a server related to the airport, the mobile terminal 400 may receive airport-related data such as flight time schedule, airport map, or the like from the server 200*a*.

The user may obtain necessary information by receiving the same from the server 200*a* through the mobile terminal 400. In addition, the mobile terminal 400 may transmit data such as a photo, a moving image, a message, etc. to the server 200*a*. For example, the user may transmit the photograph of a missing child to the server 200*a* to report the missing child or photograph an area where cleaning is required through the camera to request cleaning of the area.

In addition, the mobile terminal 400 may transmit and receive data to and from the robot 100*a*.

For example, the mobile terminal 400 may transmit, to the robot 100*a*, a signal for calling the robot 100*a*, a signal for instructing that a specific operation is performed, or an information request signal. The robot 100*a* may move to the position of the mobile terminal 400 or perform operation corresponding to the instruction signal in response to the call signal received from the mobile terminal 400. Alternatively, the robot 100*a* may transmit data corresponding to the information request signal to the mobile terminal 400 of the user.

Figure 5:
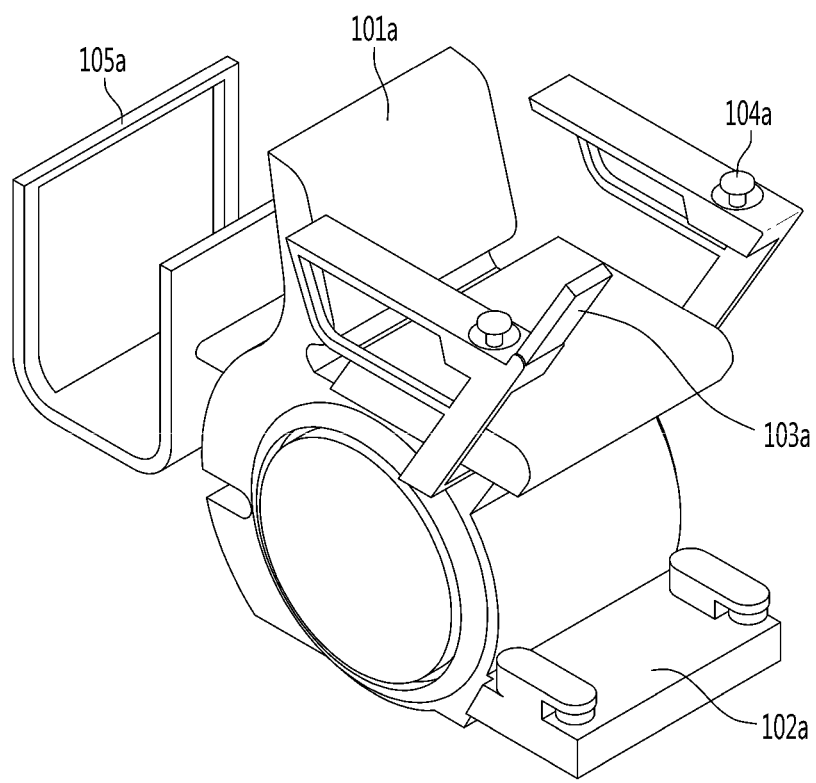
FIG. 5 is a perspective view of an exterior of a robot and components necessary for operating a PUI according to an embodiment of the present disclosure.

FIG. 5 is a perspective view of components necessary for operating a PUI and a robot 100*a* including the same according to an embodiment of the present disclosure.

Referring to FIG. 5, the components necessary for operating the PUI may include a back 101*a* (e.g., backrest), a footrest 102*a*, a display 103*a*, a handle 104*a*, and a holder 105*a*.

The back 101*a* may be able to adjust an angle and a strength (e.g., resistance), and may be designed in a tilting structure. The back 101*a* may have a center shaft formed in a seat, and may be designed to have an upper portion bendable by a motor in the center shaft.

The footrest 102*a* is movable forward and backward, and may be adjustable in consideration of a height or a leg length of the user.

The display 103*a* may include a screen positionable according to the line of user's eyes to allow the user to identify a current position, to manually operate, or to identify a destination while the robot is moving, and may be designed to be rotatable by an angle for following the direction of user's eyes.

The handle 104*a* may be fixed and positioned at an end of an armrest, and may be designed to have its position adjusted by the armrest moving forward and backward in consideration of an arm length of the user. However, the handle 104*a* may be provide at any position along the armrest and may be provided in plurality and on multiple armrests.

The holder 105*a* may be installed on the rear of the robot 100*a* to store an item that the user has or should carry, like a crutch holder or a carrier holder, but not limited to these items.

Hereinafter, the riding system of the robot 100*a* according to the present disclosure will be described through interlocking of the server 200*a*, the robot 100*a*, and the mobile terminal 400 based on FIGS. 4 and 5.

When the mobile terminal 400 calls the robot 100*a* through the application, the server 200*a* may identify a position where the application runs and may transmit the position to the robot 100*a*. In this case, when the mobile terminal 400 accesses the server 200*a*, the mobile terminal 400 may be requested to input a body size of the user and convenience information to be used while moving to the destination.

When there is a request from the user, the server 200*a* may receive a position of the user running the application from the mobile terminal 400 by interlocking with the application, and may transmit the position of the mobile terminal 400 to the robot 100*a* and may cause the robot 100*a* to move to the position of the user. According to an embodiment, the server 200*a* may periodically receive the position of the mobile terminal 400, and transmit the position of the mobile terminal 400 to the robot 100*a* periodically. Or, when the position of the mobile terminal 400 is changed, the server 200*a* may receive the changed position of the mobile terminal 400, and transmit the changed position to the robot 100*a*.

When the called robot 100*a* is in front of the user, the user may identify whether the robot 100*a* is the robot that is reserved by the user, may tag the robot 100*a* through a pre-issued code, and may be authenticated as a user to use the corresponding robot 100*a*.

The robot 100*a* may authenticate the user by comparing authentication information generated by using personal information of the user, and authentication information of a code pre-issued to the user, and, when authentication of the user fails, may provide a voice guide to instruct the user to try authentication again.

The server 200*a* may generate authentication information based on personal information which is input by the user when the user arranges reservation, and may transmit a code corresponding to the authentication information to the mobile terminal 400.

The code transmitted to the mobile terminal 400 may be a means for identifying the user who is allowed to use the corresponding robot 100*a* when the user calls the robot 100*a* in standby.

The robot 100*a* may recognize that the user who has arranged reservation is the user to use the robot 100*a* through the authentication information of the code.

When the authentication is completed, the robot 100*a* may apply a PUI. The robot 100*a* may calculate a standardized shape of the robot 100a by analyzing the body size which is stored at the time of pre-arranging, and may deform at least one of the back 101a, the footrest 102a, the display 103a, or the handle 104a to suit to the body of the user according to the standardized shape of the robot 100a.

The body size may be inputted for the purpose of providing convenience by making the respective components of the robot 100a shown in FIG. 5 suit to the user before the robot moves to the destination. If the body size is inputted, a body type may be inferred, and specifically, may be inferred based on big data.

If the body size of the user is inputted, the robot 100a may calculate an appropriate position of each component based on big data.

Regarding the body size and the convenient information, the body size may include at least one of a weight, a height, an arm length, a leg length, or a ratio of an upper body of the user to a lower body of the user, and the convenient information may include at least one of a seat size, whether a cup holder is mounted, a crutch holder, or a carrier holder. However, the property included in the body size is not limited thereto, the body size may include various information on a body type of the user.

After the robot 100a applies the PUI, the user may manually operate at least one of the back 101a, the footrest 102a, the display 103a, or the handle 104a to suit to the body of the user, and the robot 100a may inform the user of a start using a voice before starting to the destination, and may start when the user confirms the start.

The robot 100a may require confirmation of the user by using a voice in order to prevent from starting before changing to suit to the body of the user, and, when the confirmation of the user is obtained, the robot 100a may recognize that setting of the robot 100a is completed and may start to move to the destination. Although not shown in the drawing, the respective components may be designed to be manually operated after the PUI is operated, before the confirmation of the user.

The robot 100a may have its shape changed to a standby shape of the robot 100a after completing movement to the destination, and may move to a storage for a next user. The robot 100a may identify completion of movement of the user after completing movement to the destination, and then may move.

Figure 6:
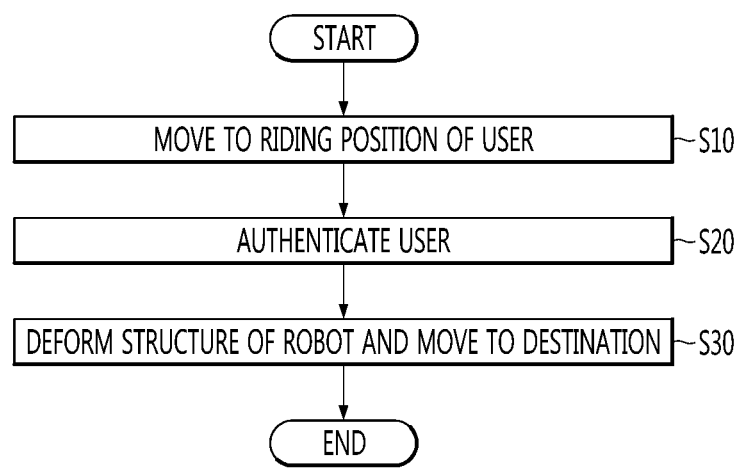
FIG. 6 is a sequence diagram of a control method of a riding system of a robot according to an embodiment of the present disclosure.

FIG. 6 is a sequence diagram of a control method of the riding system of the robot 100a according to an embodiment of the present disclosure.

Referring to FIG. 6, the present disclosure may include an operation of moving to a riding position of a user (S10), an operation of authenticating the user (S20), and an operation of deforming a structure of the robot 100a and moving to a destination (S30).

The operation of moving to the riding position of the user (S10) is a process of, when the user inputs pre-arranged use information to the server 200a through an application of the mobile terminal 400 and calls the robot 100a in standby through the application, moving, by the robot 100a, to the riding position of the user according to position transmission of the server 200a.

The server 200a may transmit and receive authentication information to and from the robot 100a, and the mobile terminal 400 may include an application interlocking with the server 200a to use the robot 100a, and the user may arrange use information of the user through the application, and may call the robot 100a in standby through the application. The application may be a dedicated application using the robot 100a.

The operation of authenticating the user (S20) is a process of tagging, by the user who stores a code issued to the user who has arranged reservation in the mobile terminal 400, the robot 100a when the user wishes to the use the robot 100a, and of authenticating the user.

When the called robot 100a is in front of the user, the user may identify whether the robot is the robot 100a that is arranged by the user, and may tag the robot 100a through the pre-issued code and may be authenticated as a user to use the corresponding robot 100a.

The robot 100a may authenticate the user by comparing authentication information generated by using personal information of the user, and authentication information of the code pre-issued to the user, and, when authentication of the user fails, the robot 100a may provide a voice guide to instruct the user to try authentication again.

The robot 100a may store the authentication information, and may authenticate the user through the authentication information when there is a call from the mobile terminal 400, and may deform a structure according to a body size of the user included in the use information, may have the user seated thereon, and may move to the destination.

The operation of deforming the structure of the robot 100a and moving to the destination (S30) is a process of deforming the structure of the robot 100a to suit to the body size of the user included in the use information, and of moving to the destination.

If the body size of the user is inputted, the robot 100a may calculate an appropriate position of each component based on big data (as known in the art). Regarding the body size and the convenient information, the body size may include at least one of a weight, a height, an arm length, a leg length, or a ratio of an upper body of the user to a lower body of the user, and the convenient information may include at least one of a seat size, whether a cup holder is mounted, a crutch holder, or a carrier holder.

Figure 7:
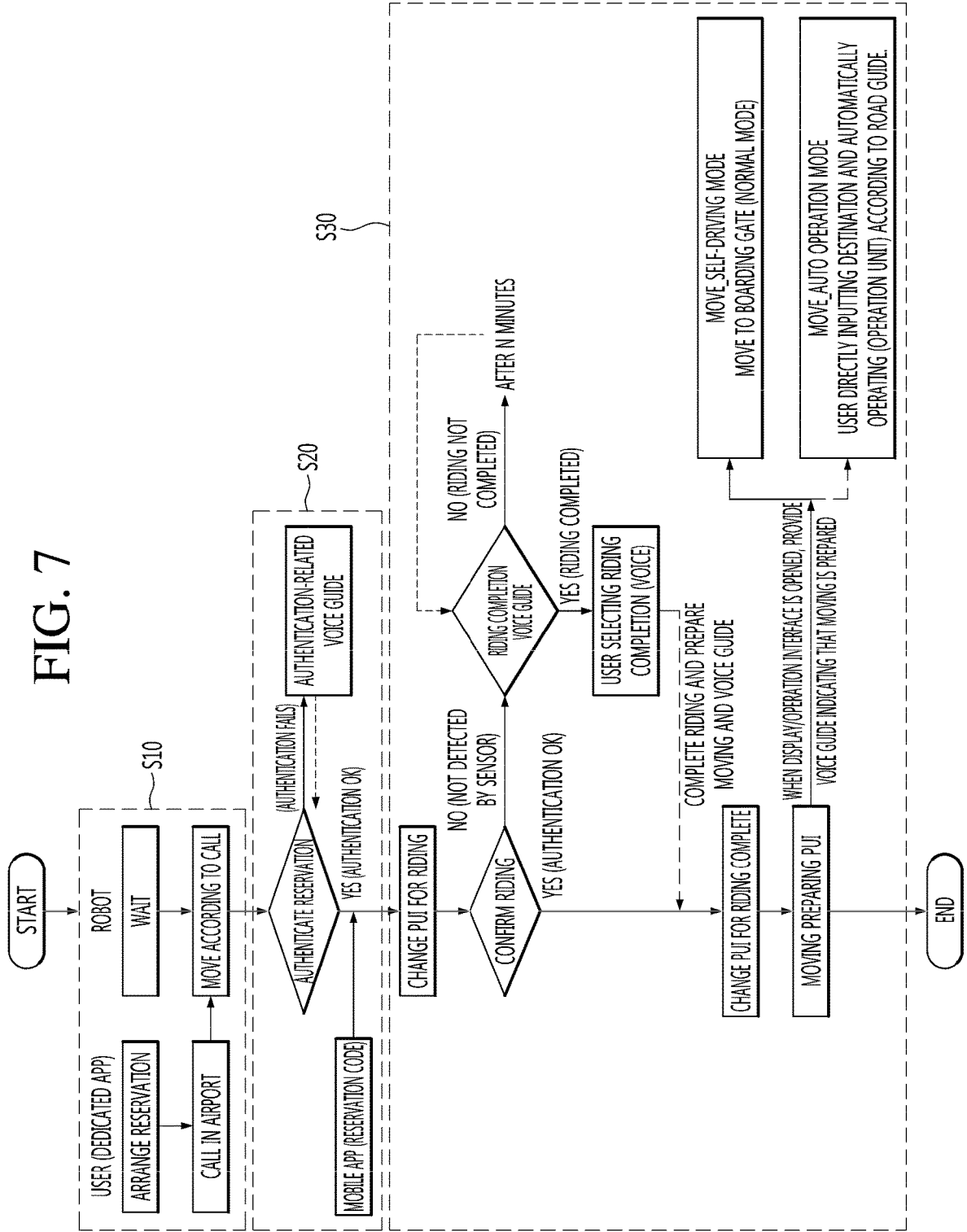
FIG. 7 is a sequence diagram showing the sequence diagram of FIG. 6 in detail according to an embodiment of the present disclosure.
Figure 8:
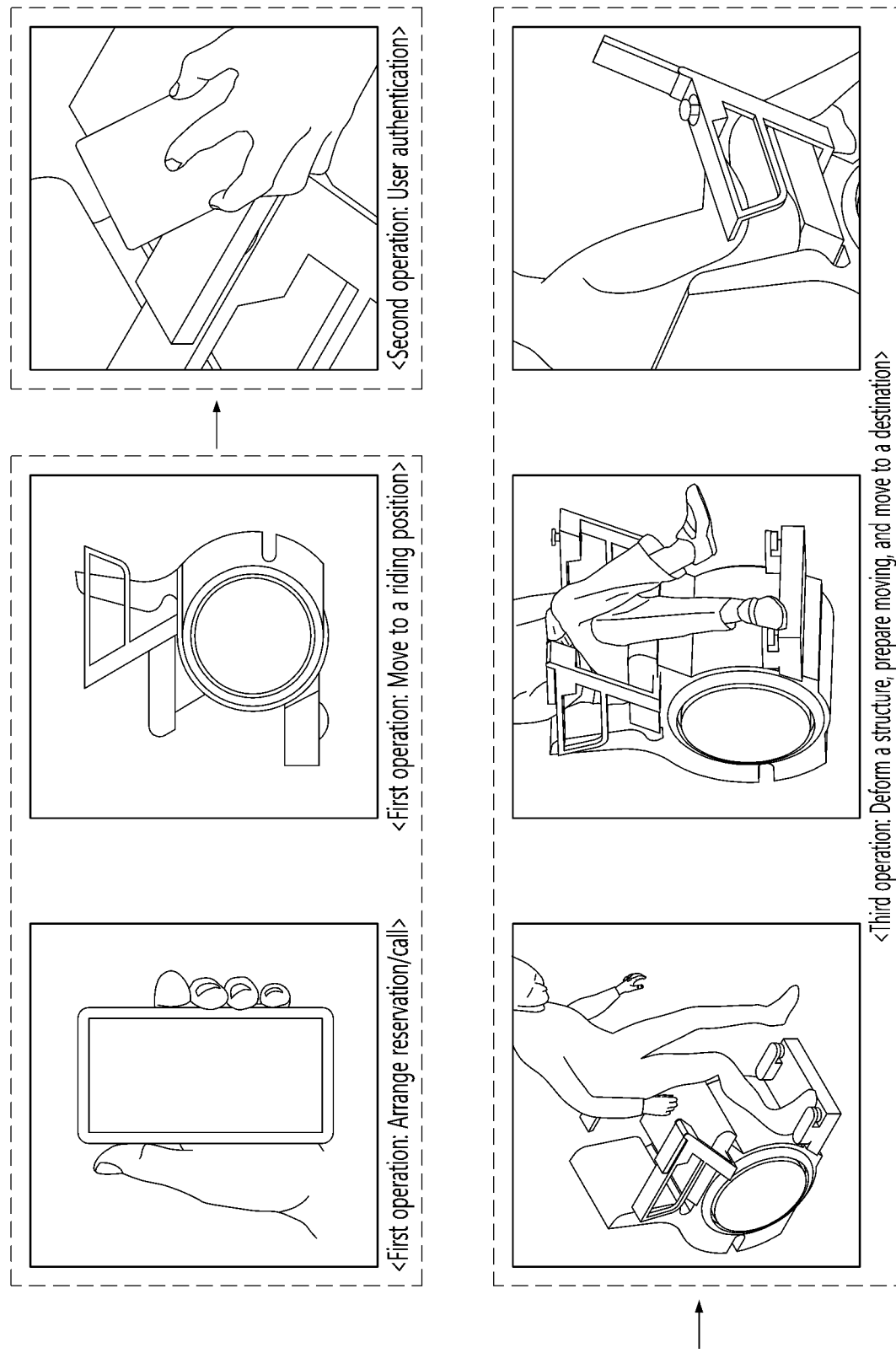
FIG. 8 is a diagram illustrating a control method of a riding system of a robot according to an embodiment of the present disclosure.

FIG. 7 is a sequence diagram illustrating the sequence diagram of FIG. 6 in detail according to an embodiment of the present disclosure, and FIG. 8 is a view illustrating the control method of the riding system of the robot 100a according to an embodiment of the present disclosure.

Referring to FIG. 7, it can be seen that the first operation (S10), the second operation (S20) and the third operation (S30) described above are a process of interlocking in the mobile terminal 400 of the user, the robot 100a, and the server 200a. FIG. 7 will be described with reference to a drawing of each operation of FIG. 8.

The first operation (S10) may refer to a process of arranging, by the user, reservation of the robot 100a through the application of the mobile terminal 400, and then calling the robot 100a. This process may include inputting a body size of the user when the mobile terminal 400 accesses the server 200a.

The body size may include at least one of a weight, a height, an arm length, a leg length, or a ratio of an upper body of the user to a lower body of the user. The body size may be inputted for the purpose of proceeding with a PUI process after user authentication is completed, and herein, inputting the body size may include a process of inputting, by the user, convenient information to be used.

The convenient information may include at least one of a seat size, whether a cup holder is mounted, a crutch holder, or a carrier holder.

In the first operation (S10), a code corresponding to personal information of the user may be issued to the mobile terminal 400 of the user, and may be utilized as a means for authenticating in the second operation.

The first operation (S10) may include waiting, by the robot 100a storing the use information, in a storage, recognizing, by the server 200a, a position of the application when the mobile terminal 400 accesses the server 200a, and transmitting the position where the application runs to the robot 100a from the server 200a. The robot 100a may receive the position where the application runs from the server 200a, and may move to the position of the user who calls the robot.

The second operation (S20) is a process of authenticating the user, that is, a process of authenticating arrangement to identify whether the user is the user who has arranged reservation. The robot 100a may authenticate the user by comparing authentication information generated by using personal information of the user, and authentication information of the pre-issued code.

According to an embodiment, the robot 100a may move to the position of the user and wait, and may provide an authentication-related voice guide. When authentication of the user fails, the robot 100a may provide a voice guide to instruct the user to try authentication again at predetermined time intervals.

According to an embodiment, a waiting time limit may be set, and, when the robot waits longer than the waiting time limit set by the user, the robot may return to the storage.

The third operation (S30) may include a riding confirmation process of the user through user authentication. The riding may be confirmed by using sensors installed in the robot 100a, and according to an embodiment, the above-described user confirmation process may be performed.

The user confirmation process is a process of requiring confirmation of the user on whether the user completely rides through a voice guide regarding completion of riding, and, when the confirmation is not obtained, the voice guide may be provided again at a predetermined interval.

In the third operation (S30), the PUI may be changed according to the body size. In the first operation, the inputted body size of the user may be analyzed and a standardized shape of the robot 100a may be calculated. In the third operation, the structure of the robot 100a may be deformed according to the standardized shape of the robot 100a.

In the third operation (S30), at least one of the back 101a, the footrest 102a, the display 103a, or the handle 104a of the robot 100a may be deformed to suit to the body of the user. In addition, the third operation may further include a process of manually operating to suit to the body of the user.

The third operation (S30) may include informing the user of a start through a voice before starting to the destination, and starting to the destination based on confirmation of the user.

After the robot 100a applies the PUI, the user may manually operate at least one of the back 101a, the footrest 102a, the display 103a, or the handle 104a to suit to the body of the user, and may inform the user of the start through a voice before starting to the destination, and may start when the user confirms the start.

The robot 100a may require confirmation of the user through a voice in order to prevent from starting before changing to suit to the body of the user, and, when the confirmation is obtained, may recognize that setting of the robot 100a is completed and may start to move to the destination.

After the third operation (S30), the method may include changing the robot 100a to a standby state, and moving the robot 100a to the storage.

After completing movement to the destination, the robot 100a may have its shape changed to the standby shape of the robot 100a, and may move to the storage for a next user. After completing movement to the destination, the robot 100a may move when the user confirms completion of movement.

According to an embodiment, in the case of an airport robot 100a, the robot 100a may move to a boarding gate which is a destination through self-driving, and, if there is a place where the user wishes to stop by, the user may manually operate the robot through an operation unit and may change the moving path of the robot 100a.

According to an embodiment, after arriving at the destination, the robot may obtain confirmation of the user that the user arrives at the destination, and may identify that control of the robot 100a is completed. In this case, the robot 100a may have its shape changed to an original state when the robot is initially stored in the storage, and may move to the storage for a next user and may wait.

According to the present disclosure having the above-described configuration, there are advantages that the user can easily and safely ride on the robot 100a without help from another person, and inconvenience of a related-art method of having to borrow and return the robot 100a after arranging reservation and inquiring about the robot and an aid device can be solved.

In addition, according to the present disclosure, the PUI is automatically changed and a voice guide is provided, and thus there is an advantage that the robot can be easily used by a disabled person or a novice user.

According to the present disclosure having the above-described configuration, the user can easily and safely ride on the robot without help from another person.

In addition, according to the present disclosure, there is an advantage that inconvenience of a related-art method of having to borrow and return the robot after arranging reservation and inquiring about the robot and an aid device can be solved.

In addition, according to the present disclosure, the PUI is automatically changed and a voice guide is provided, and thus there is an advantage that the robot can be easily used by a disabled person or a novice user.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A control method of a riding system of a robot which moves a user to a destination, the method comprising:
   when the user inputs use information to a server through an application of a mobile terminal and the user calls a robot in standby through the application, a first operation of moving, by the robot, to a position of the mobile terminal,
   wherein the use information includes the destination and a body size of the user;
   in response to the user bringing a pre-issued code included in the mobile terminal of the user into contact with the robot, a second operation of authenticating the user, by the robot; and a third operation of deforming a structure of the robot to suit the body size of the user, and moving the robot to the destination.

2. The method of claim 1, wherein the first operation comprises inputting the body size of the user when the mobile terminal accesses the server, and
wherein the body size comprises at least one of a weight of the user, a height of the user, an arm length of the user, a leg length of the user, or a ratio of an upper body of the user to a lower body of the user.

3. The method of claim 1, wherein the first operation further comprises inputting convenient information of the user when the mobile accesses the server, and
wherein the convenient information comprises at least one of a seat size of the robot, whether a cup holder is mounted to the robot, whether a crutch holder is mounted to the robot, or whether a carrier holder is mounted to the robot.

4. The method of claim 1, wherein the first operation further comprises:
storing, by the robot, the use information;
waiting, by robot, at a standby position while the robot is in standby;
when the mobile terminal accesses the server, recognizing, by the server, the position of the mobile terminal by interlocking with the application; and
transmitting to the robot, by the server, the position of the mobile terminal.

5. The method of claim 1, wherein the second operation of authenticating the user includes comparing first authentication information generated by using personal information of the user with second authentication information of the pre-issued code.

6. The method of claim 5, wherein when authentication of the user fails, the second operation further comprises providing, by the robot, a voice guide to instruct the user to reattempt user authentication.

7. The method of claim 1, wherein the third operation further comprises:
calculating a standardized robot shape by analyzing the body size of the user; and
deforming at least one of a back, a footrest, a display, or a handle of the robot to suit to the body size of the user.

8. The method of claim 7, wherein the third operation further comprises:
providing a voice guide to inform the user that the robot will begin moving and to request confirmation of the user, by the robot, before moving the robot to the destination; and
when the user confirms the request, moving the robot to the destination.

9. The method of claim 1, further comprising, after the third operation:
changing, by the robot, to a standby shape; and
moving the robot to a storage space.

10. A riding system of a robot which moves a user to a destination, the system comprising:
a robot;
a server configured to exchange authentication information with the robot; and
a mobile terminal comprising an application interlocked with the server to allow for the user to control of the robot and configured to:
arrange use information of the user, through the application, and
call the robot in standby through the application, wherein the use information includes the destination and a body size of the user, and
wherein the robot is configured to:
store the authentication information,
when the robot receives a call from the mobile terminal through the application, authenticate the user using the authentication information, and
deform a structure of the robot according to the body size of the user.

11. The system of claim 10, wherein, when the mobile terminal calls the robot through the application, the server is configured to:
identify a position of the mobile terminal, and
transmit the position of the mobile terminal to the robot.

12. The system of claim 10, wherein, when the mobile terminal accesses the server, the mobile terminal is configured to be requested to input the body size of the user and convenient information to use while moving to the destination,
wherein the body size comprises at least one of a weight of the user, a height of the user, an arm length of the user, a leg length of the user, or a ratio of an upper body of the user to a lower body of the user, and
wherein the convenient information comprises at least one of a seat size of the robot, whether a cup holder is mounted to the robot, whether a crutch holder is mounted to the robot, or whether a carrier holder is mounted to the robot.

13. The system of claim 10, wherein the authentication information includes first authentication information generated based on personal information of the user and second authentication information of a code pre-issued to the user,
wherein the robot authenticates the user by comparing the first authentication information with the second authentication information, and
wherein when authentication of the user fails, the robot is further configured to provide a voice guide to instruct the user to reattempt user authentication.

14. The system of claim 13, wherein the robot is further configured to:
calculate a standardized robot shape by analyzing the body size of the user, and
deform at least one of a back, a footrest, a display, or a handle of the robot to suit to the body size of the user according to the standardized robot shape.

15. The system of claim 14, wherein the robot is further configured to:
provide a voice guide to inform the user that the robot will being moving and to request confirmation of the user, before starting to the destination, and
when the user confirms the request, move to the destination.

16. The system of claim 10, wherein the robot is further configured to:
change to a standby shape of the robot after completing moving to the destination, and
move to a storage space.

17. A riding system of a robot which moves a user to a destination by using authentication information, the system comprising:
a robot;
a server configured to exchange the authentication information with the robot; and
a mobile terminal communicating with the server to call the robot,
wherein the robot is configured to:

when the robot receives a call from the mobile terminal through the server, authenticate the user through the authentication information, and deform a structure of the robot to accommodate a body size of the user.

18. The system of claim 17, wherein, when the mobile terminal calls the robot, the server is configured to identify a position of the mobile terminal and to transmit the position of the mobile terminal to the robot.

19. The system of claim 17, wherein the robot is configured to:

change to a standby shape of the robot after completing moving to the destination, and move to a storage space.

20. The system of claim 17, wherein the authentication information includes first authentication information generated based on personal information of the user and second authentication information of a code pre-issued to the user, and wherein the robot is configured to:

authenticate the user by comparing the first authentication information with the second authentication information, and when authentication of the user fails, provide a voice guide to instruct the user to reattempt user authentication.

* * * * *